(12) United States Patent
Shue

(10) Patent No.: US 9,575,493 B2
(45) Date of Patent: *Feb. 21, 2017

(54) TAKEOFF/LANDING TOUCHDOWN PROTECTION MANAGEMENT SYSTEM

(71) Applicant: TEXTRON INNOVATIONS INC., Providence, RI (US)

(72) Inventor: Shyhpyng Jack Shue, Grapevine, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/168,324

(22) Filed: May 31, 2016

(65) Prior Publication Data

US 2016/0349759 A1 Dec. 1, 2016

Related U.S. Application Data

(63) Continuation of application No. 13/488,916, filed on Jun. 5, 2012, now Pat. No. 9,354,635.

(51) Int. Cl.
| | | |
|---|---|---|
| *G05D 1/06* | (2006.01) | |
| *B64C 13/50* | (2006.01) | |
| *B64D 45/00* | (2006.01) | |

(52) U.S. Cl.
CPC ........... *G05D 1/0653* (2013.01); *B64C 13/503* (2013.01); *B64D 45/00* (2013.01); *G05D 1/0676* (2013.01)

(58) Field of Classification Search
CPC .. B64C 13/503; B64C 27/20; B64C 2201/108; B64C 25/001; G05D 1/0061; G05D 1/0077; G05D 1/0825; G05D 1/0676; B60W 10/04
See application file for complete search history.

(56) References Cited

U.S. PATENT DOCUMENTS

| | | | | |
|---|---|---|---|---|
| 2011/0299470 | A1* | 12/2011 | Muller | ...... H04Q 9/00 370/328 |
| 2012/0277933 | A1* | 11/2012 | Krogh | ...... G05D 1/0061 701/11 |

* cited by examiner

*Primary Examiner* — Jelani Smith
(74) *Attorney, Agent, or Firm* — James E. Walton

(57) ABSTRACT

An air/ground contact logic management system for use with fly-by-wire control systems in an aircraft. The system includes a first sensor configured to provide an output signal to determine when the aircraft is in a transition region. A logic management system is in communication with the first sensor and is configured to receive and process the output signal and classify a mode of the aircraft. A controller receives signal data from the logic management system and communicates with a control axis actuator to regulate a level of control authority provided to a pilot. The control authority is individually regulated within each integrator as a result of the individual landing gear states.

20 Claims, 14 Drawing Sheets

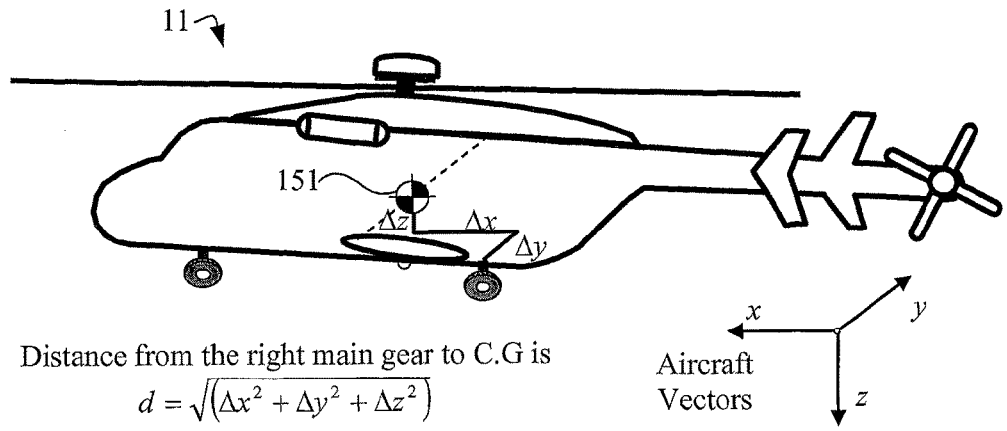

Distance from the right main gear to C.G is
$$d = \sqrt{(\Delta x^2 + \Delta y^2 + \Delta z^2)}$$
$$d_{xy} = \sqrt{(\Delta x^2 + \Delta y^2)}$$
$$d_{xz} = \sqrt{(\Delta x^2 + \Delta z^2)}$$
$$d_{yz} = \sqrt{(\Delta y^2 + \Delta y^2)}$$

Aircraft Vectors

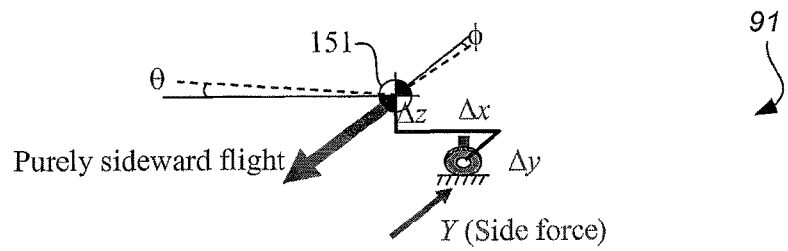

Purely sideward flight $Y$ (Side force)

$Y$ (side force on the wheel always opposes aircraft maneuver when a single wheel touches or grounds)
$L = Y \times sin(\theta) \times cos(\phi) \times \Delta y$; Lateral moment
$N = Y \times sin(\phi) \times sin(\theta) \times \Delta z$; Yawing moment
$M = Y \times cos(\theta) \times \Delta x$; Pitch moment

FIG. 7

Table I: Nose Gear WOG in-air + L/R Main Gear WOG Status alone

| LDG Status/ Conditions | Nose Gear Touch only | Nose Gear Touch Down | Left Main Touch only | Left Main Touch Down | Right Main Touch only | Right Main Touch Down | Signals | Comment AIR/Touch/GND |
|---|---|---|---|---|---|---|---|---|
| 1 | | | | | | | (0,0,0) | In Air |
| 2 | | | ✓ | | | | (0,1,0) | In Touch |
| 3 | | | | | ✓ | | (0,0,1) | In Touch |
| 4 | | | ✓ | | ✓ | | (0,1,1) | In Touch |
| 5 | | | ✓ | ✓ | | | (0,3,0) | In Touch |
| 6 | | | ✓ | | ✓ | ✓ | (0,0,3) | In Touch |
| 7 | | | ✓ | ✓ | ✓ | | (0,1,3) | On Ground |
| 8 | | | ✓ | ✓ | ✓ | | (0,3,1) | On Ground |
| 9 | | | ✓ | ✓ | ✓ | ✓ | (0,3,3) | On Ground |

FIG. 10A

Table II: Nose Gear WOG touch + L/R Main Gear Status

| LDG Status/Conditions | Nose Gear Touch only | Nose Gear Touch Down | Left Main Touch only | Left Main Touch Down | Right Main Touch only | Right Main Touch Down | Signals | Comment AIR/Touch/GND |
|---|---|---|---|---|---|---|---|---|
| 10 | ✓ |  |  |  |  |  | (1,0,0) | In Touch |
| 11 | ✓ |  | ✓ |  |  |  | (1,1,0) | In Touch |
| 12 | ✓ |  |  |  | ✓ |  | (1,0,1) | In Touch |
| 13 | ✓ |  | ✓ |  | ✓ |  | (1,1,1) | In Touch |
| 14 | ✓ |  |  | ✓ |  |  | (1,3,0) | On Ground |
| 15 | ✓ |  |  |  |  | ✓ | (1,0,3) | On Ground |
| 16 | ✓ |  | ✓ |  |  | ✓ | (1,1,3) | On Ground |
| 17 | ✓ |  |  | ✓ | ✓ |  | (1,3,1) | On Ground |
| 18 | ✓ |  |  | ✓ |  | ✓ | (1,3,3) | On Ground |

{ 131 } columns: Nose Gear, Left Main, Right Main
{ 129, 126 } Signals
{ 109, 111, 113, 117, 119, 121 } Comment

FIG. 10B

Table III: Nose Gear WOG down + L/R Main Gear Status

| LDG Status/Conditions | Nose Gear Touch only | Nose Gear Touch Down | Left Main Touch only | Left Main Touch Down | Right Main Touch only | Right Main Touch Down | Signals | Comment ATR/Touch/GND |
|---|---|---|---|---|---|---|---|---|
| 19 | ✓ |  |  |  |  |  | (3,0,0) | In Touch |
| 20 | ✓ | ✓ | ✓ |  |  |  | (3,1,0) | On Ground |
| 21 | ✓ | ✓ | ✓ |  | ✓ |  | (3,0,1) | On Ground |
| 22 | ✓ | ✓ | ✓ | ✓ |  |  | (3,1,1) | On Ground |
| 23 | ✓ | ✓ | ✓ | ✓ |  |  | (3,3,0) | On Ground |
| 24 | ✓ | ✓ | ✓ |  | ✓ | ✓ | (3,0,3) | On Ground |
| 25 | ✓ | ✓ | ✓ | ✓ | ✓ | ✓ | (3,1,3) | On Ground |
| 26 | ✓ | ✓ | ✓ | ✓ | ✓ |  | (3,3,1) | On Ground |
| 27 | ✓ | ✓ | ✓ | ✓ | ✓ | ✓ | (3,3,3) | On Ground |

FIG. 10C

TAKEOFF/LANDING TOUCHDOWN PROTECTION MANAGEMENT SYSTEM

CROSS REFERENCE TO RELATED APPLICATIONS

This application is a continuation of U.S. application Ser. No. 13/488,916, filed 5 Jun. 2012, titled "Takeoff/Landing Touchdown Protection Management System," which issued on 31 May 2016 under U.S. Pat. No. 9,354,635; which is hereby incorporated by reference for all purposes as if fully set forth herein.

BACKGROUND

1. Field of the Invention

The present application relates generally to aircraft control systems and, more particularly, to an air/ground contact logic management system.

2. Description of Related Art

Historically, conventional manual flight controls were used predominantly in aircraft. Manual controls provided a pilot direct feedback concerning the aircraft and external conditions. More recently, fly-by-wire (FBW) systems have been introduced to increase an aircraft's maneuverability and stability. With FBW systems, movements of flight controls are converted to electronic signals that are transmitted by wires, while flight control computers determine how to move actuators at each control surface to provide the ordered response. The FBW system can also be programmed to automatically send signals to through the computers to perform functions without the pilot's input.

Although FBW systems have made improvements over conventional manual flight controls, some deficiencies exist. Some FBW designs operate to place the cyclic controller close to the center position in longitudinal and lateral axes, regardless of whether the aircraft is on a ground slope or subjected to sideward wind conditions. This has the effect of removing the pilot's "feel" in the cyclic controller. These designs typically increase the degree of difficulty in handling the aircraft. Other designs fail to provide a logic design in the control system that adequately avoids actuator wind-up on landing which may result in the ground as a pivot point to diverge the actuator travel.

An example of a design related to fixed wing aircraft to help aircraft during landing maneuvers is that the fixed-wing aircraft wheels may automatically spin up to avoid tire bursts during touchdown. Additionally, brake systems are controlled to prevent the application of brake pressure until the wheel on gear signals properly indicate on-ground status and wheel spin reaches a specified value. Such designs may have limited use for rotorcraft. Other traditional designs permit an aircraft control system to detect ground proximity, on-ground status, or in-flight status. However, these systems typically do not adequately perform air/ground transitions for rotorcraft in the flight control system. Failure to adequately control an aircraft during such transitioning between in-flight and on-ground can lead to accidents and safety concerns A system combining logic management with ground operation needs to be developed. An emphasis on a ground contact maneuver for a blend of manned and unmanned logic management in air/ground contact designs has been recognized. Increasing numbers of un-manned or manned aircraft have lost control during landing. Such results have generally shown the importance and consolidation of requirements for air/ground contact logic management design.

Although great strides have been made in regards to FBW logic design, considerable shortcomings remain.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

FIG. 7 is a diagram of the relationship of the main landing gear with respect to the center of gravity of the rotorcraft of FIG. 1 along with representative forces that may act upon the rotorcraft;

FIGS. 10A-10C are tables illustrating various state combinations of the landing gear of FIG. 6 and the associated score assigned by the logic of FIG. 5 to determine the mode of the rotorcraft of FIG. 1;

Figure 1:
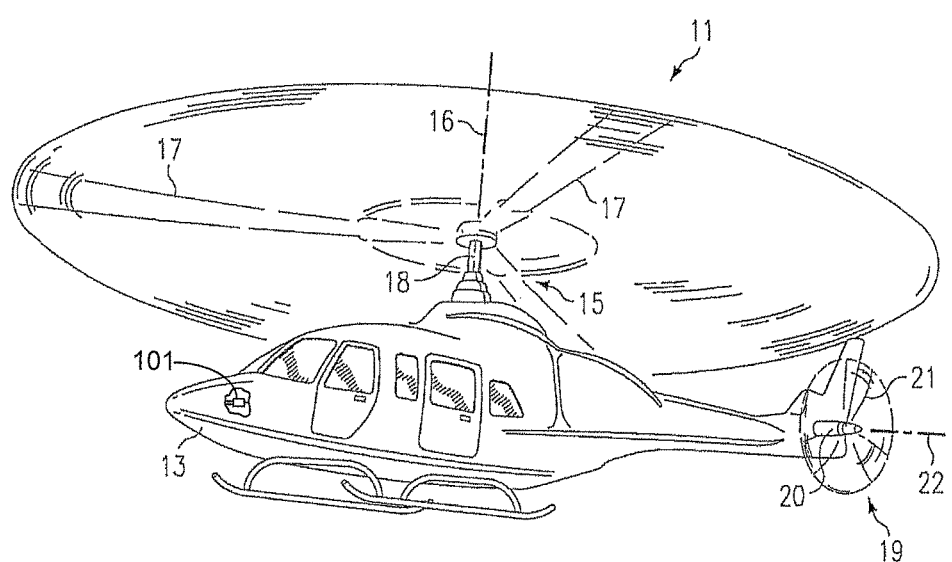
FIG. 1 is a perspective view of a rotorcraft having the an air/ground contact logic management system according to the preferred embodiment of the present application.

While the system and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

Referring now to FIG. 1 in the drawings, a rotorcraft 11 having an air/ground contact logic management system 101 is illustrated. Rotorcraft 11 has a body 13 and a main rotor assembly 15, including main rotor blades 17 and a main rotor shaft 18. Rotorcraft 11 has a tail rotor assembly 19, including tail rotor blades 21 and a tail rotor shaft 20. Main rotor blades 17 generally rotate about a longitudinal axis 16 of main rotor shaft 18. Tail rotor blades 21 generally rotate about a longitudinal axis 22 of tail rotor shaft 20. Rotorcraft 11 also includes air/ground contact logic management system 101 within body 13 according to the present disclosure.

Although described as using system 101 with rotorcraft 11, it is understood that system 101 may be used on any aircraft such as, fixed wing aircraft and tilt-rotor aircraft, for example. Furthermore, it is understood that system 101 is configured to be operable with manned or un-manned aircraft. Additionally, FIG. 1 illustrates skids as landing gear on rotorcraft 11. In the present application, discussion will involve the use of tricycle landing gear having a nose gear, a left main gear, and a right main gear.

Figure 2:
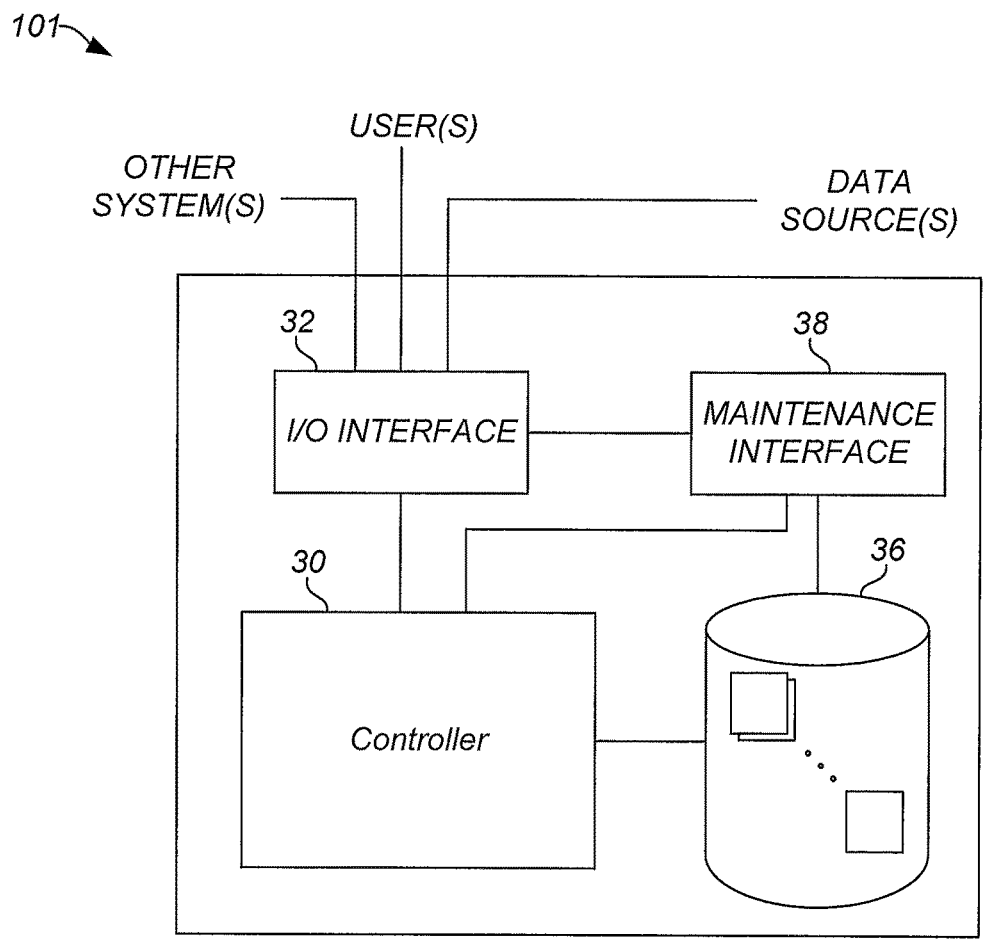
FIG. 2 is an exemplary schematic of functional components used within the system of FIG. 1.

Referring now also to FIG. 2 in the drawings, a basic schematic of an exemplary logic management system 101 is illustrated. System 101 is configured to selectively regulate the control authority of a pilot during selective procedures within a transit region 125 in order to limit actuator run-off and a loss of control of the aircraft due to Fly-By-Wire (FBW) characteristics. System 101 includes a general computerized device, such as a controller 30 for example. System 101 uses controller 30 and one or more sensors and logic in communication with rotorcraft 11 to supply and process electronic data and signals to regulate the control authority of the pilot. Controller 30 can be a computer, a flight control computer, or a portion of any other control device used to control rotorcraft 11, for example.

System 101 includes an input/output (I/O) interface 32, a controller 30, a database 36, and a maintenance interface 38. Alternative embodiments can combine or distribute the input/output (I/O) interface 32, controller 30, database 36, and maintenance interface 38 as desired. Embodiments of system 101 can include one or more computers that include one or more processors and memories configured for performing tasks described herein below. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers includes a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among one or more machines. It should also be appreciated that such machines need not be dedicated to performing tasks described herein, but instead can be multi-purpose machines, for example computer workstations, that are suitable for also performing other tasks. Furthermore the computers may use transitory and non-transitory forms of computer-readable media. Non-transitory computer-readable media is to be interpreted to comprise all computer-readable media, with the sole exception of being a transitory, propagating signal.

The I/O interface 32 provides a communication link between external users, systems, and data sources and components of system 101. The I/O interface 32 can be configured for allowing one or more users to input information to system 101 via any known input device. Examples can include a keyboard, mouse, touch screen, microphone, and/or any other desired input device. The I/O interface 32 can be configured for allowing one or more users to receive information output from system 101 via any known output device. Examples can include a display monitor, a printer, a speaker, and/or any other desired output device. The I/O interface 32 can be configured for allowing other systems to communicate with system 101. For example, the I/O interface 32 can allow one or more remote computer(s) to access information, input information, and/or remotely instruct system 101 to perform one or more of the tasks described herein. The I/O interface 32 can be configured for allowing communication with one or more remote data sources. For example, the I/O interface 32 can allow one or more remote data source(s) to access information, input information, and/or remotely instruct system 101 to perform one or more of the tasks described herein.

The database 36 provides persistent data storage for system 101. While the term "database" is primarily used, a memory or other suitable data storage arrangement may provide the functionality of the database 36. In alternative embodiments, the database 36 can be integral to or separate from system 101 and can operate on one or more computers. The database 36 preferably provides non-volatile data storage for any information suitable to support the operation of system 101, including various types of data discussed below.

The maintenance interface 38 is configured to allow users to maintain desired operation of system 101. In some embodiments, the maintenance interface 38 can be configured to allow for reviewing and/or revising the data stored in the database 36 and/or performing any suitable administrative tasks commonly associated with database management. This can include, for example, updating database management software, revising security settings, and/or performing data backup operations. In some embodiments, the maintenance interface 38 can be configured to allow for maintenance of system 101 and/or the I/O interface 32. This can include, for example, software updates and/or administrative tasks such as security management and/or adjustment of certain tolerance settings.

Controller 30 is configured for determining the mode of rotorcraft 11 by interpreting inputs from various systems in communication with the aircraft and to process those inputs to selectively limit control authority given to a pilot, according to embodiments disclosed herein. Controller 30 can include various combinations of one or more processors, memories, and software components. Controller 30 is configured to perform various processes and calculations for selectively determining the mode of rotorcraft 11 and thereby accurately limiting the control authority, as described herein with regard to the remaining Figures.

Figure 3:
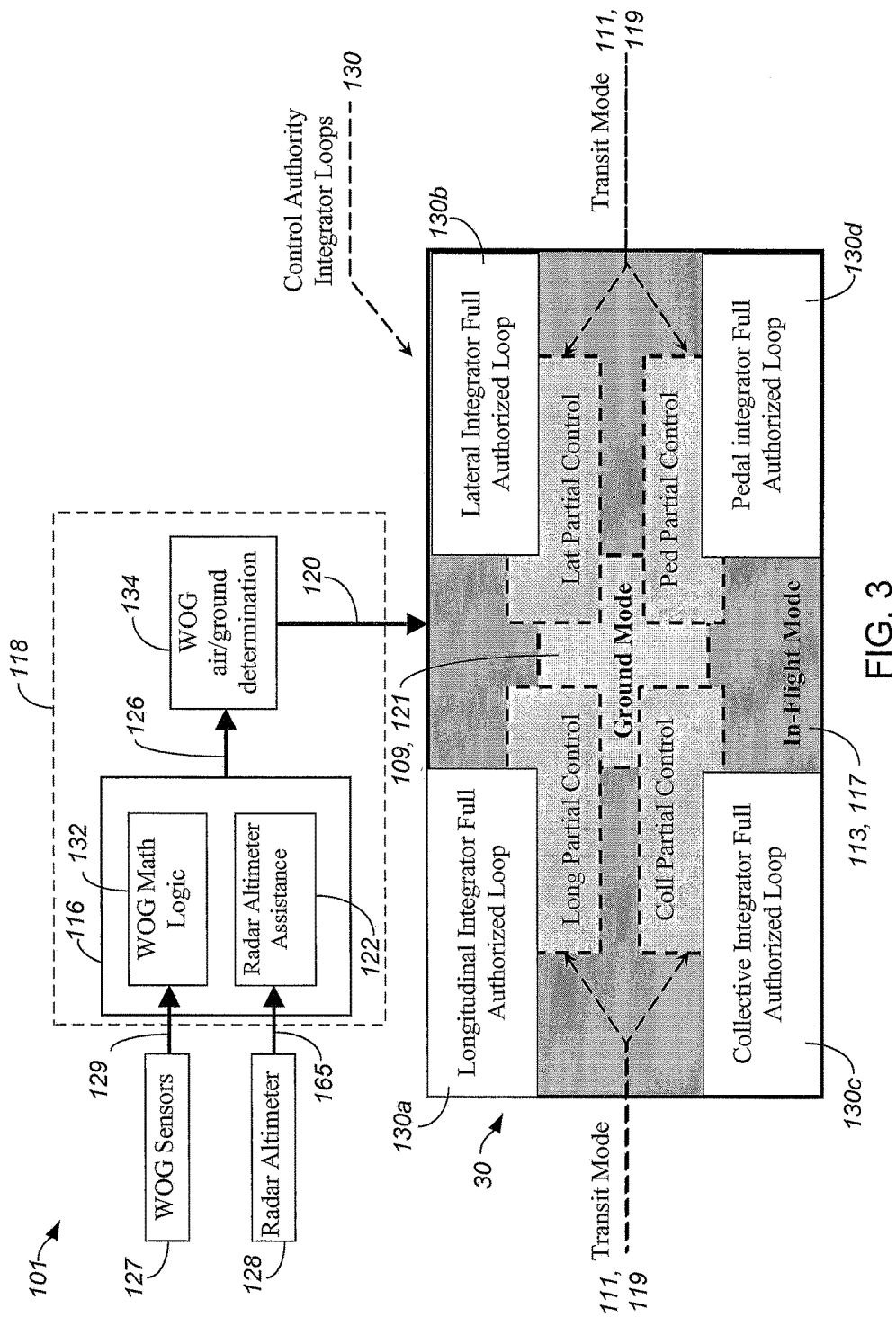
FIG. 3 is a simplified schematic of the system of FIG. 1.
Figure 4:
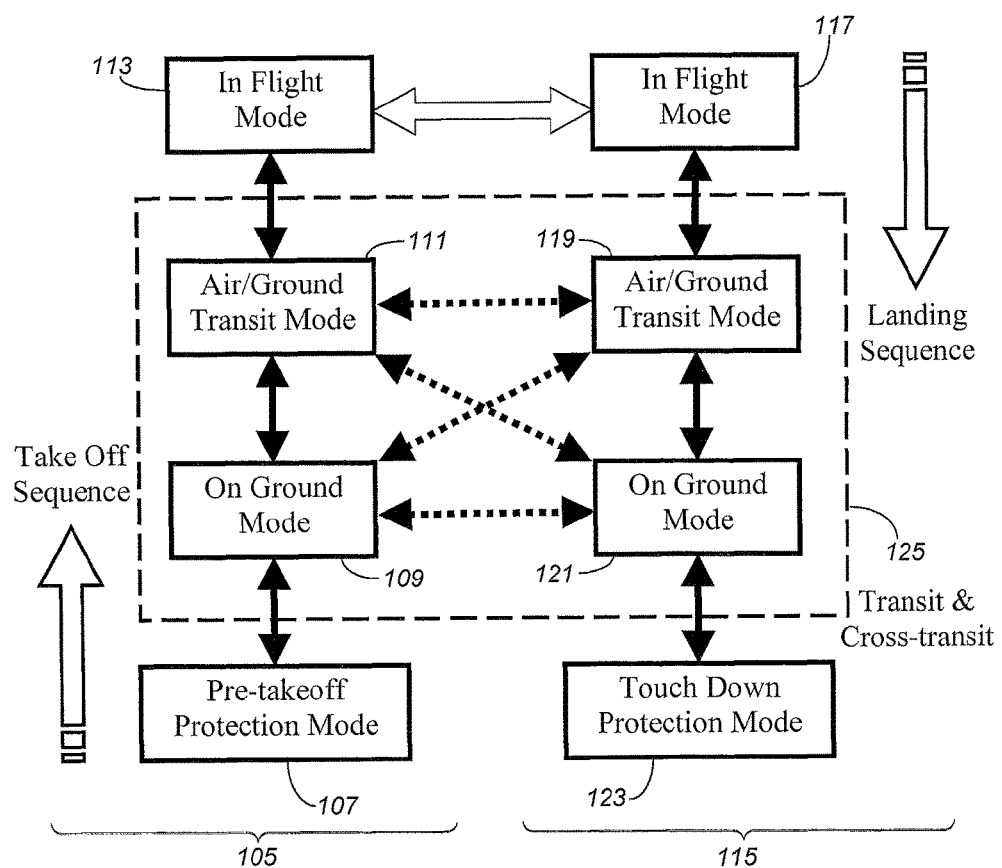
FIG. 4 is a chart of the takeoff and landing sequence of the rotorcraft of FIG. 1.
Figure 5:
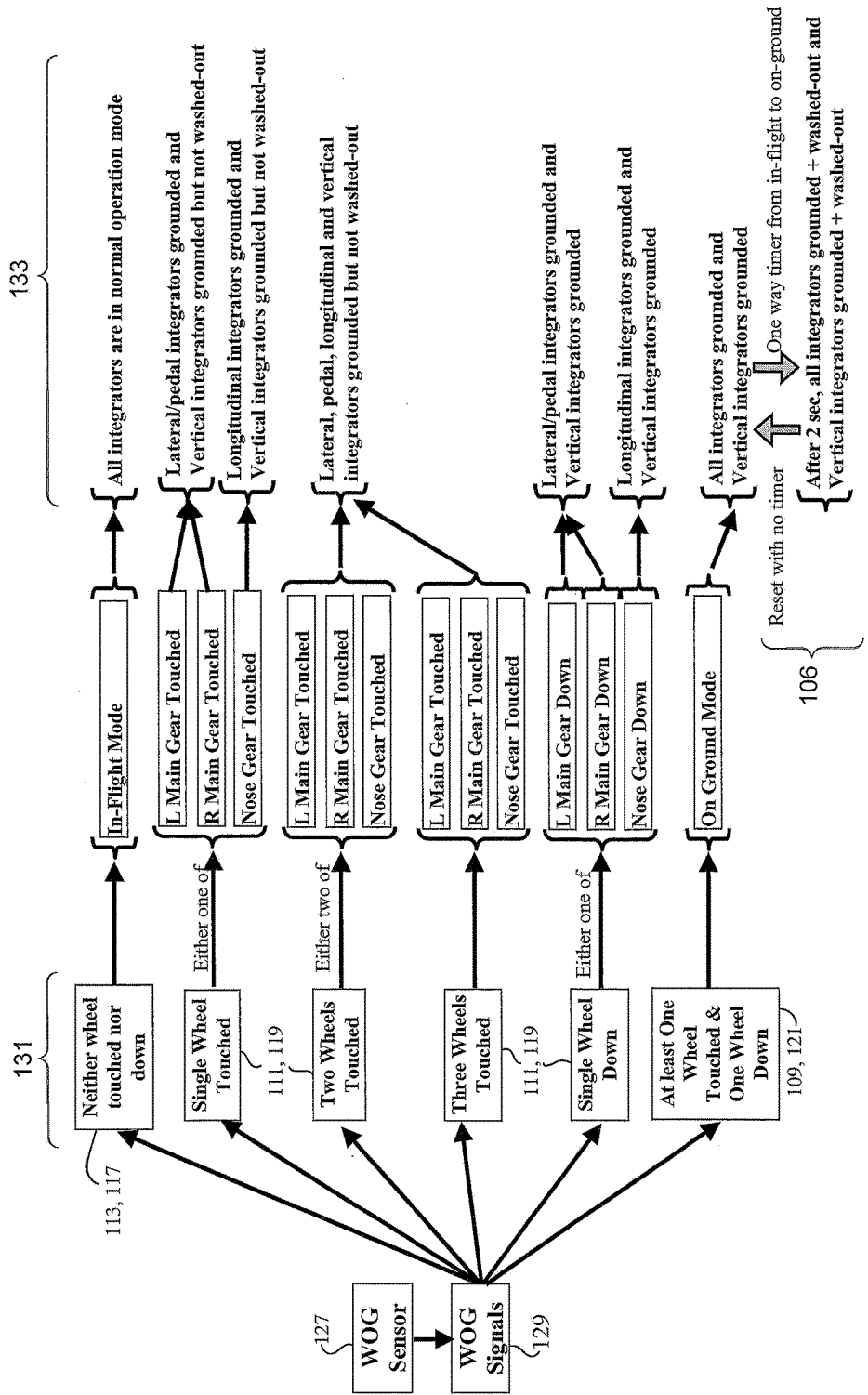
FIG. 5 a chart of Weight-on-gear logic used within the system of FIG. 1 to determine when and whether individual integrators in each axis are switched between normal, grounded, or washed-out conditions.

Referring now to FIGS. 3-5 in the drawings, system 101 is illustrated. Rotorcraft 11 includes system 101 for regulating the amount and type of control authority 130 granted to a pilot, or operator, as rotorcraft 11 transitions between a takeoff sequence 105 and a landing sequence 115, or any position between sequences 105, 115. In order to regulate the control authority 130 correctly, system 101 is configured to determine and classify the flight status, or mode, of rotorcraft 11 as being in at least one of the following modes: in-flight mode, in air/ground transit mode, and on-ground mode (see FIG. 4). Control authority 130 is limited according to the mode of rotorcraft 11. System 101 uses FBW control laws, a logic management system 118, and at least one sensor to accurately determine the proper mode of rotorcraft 11 and effectively regulate control authority.

Unique trim controllers or back-driven displacement trim controller designs in longitudinal, lateral and directional axes are employed for FBW control input. Conventional back-driven displacement trim collective controllers are used for vertical axis control. FBW control laws are incorporated within existing systems on rotorcraft 11, such as the flight control computer for example. Controller 30 is in communication with existing systems on rotorcraft 11. In particular, controller 30 is in communication with FBW control laws and associated integrators, such that controller 30 is configured to regulate the FBW control laws and integrators. Controller 30 may be separate from or integrated into existing aircraft systems. For example, it is understood that controller 30 may be integrated into control systems, such as the existing flight control computer. Through system 101, air/ground contact logic are designed into FBW control laws, such that the following maneuvers are achievable:

At any proper takeoff, landing, and ground operation conditions, all actuator integrators within the control laws from longitudinal, lateral, pedal and collective axes are not wound-up
Multiple successive takeoffs and landings and quick repositions or landing spot changes
Sloped surface landing and takeoff
Single or dual wheel contact operation
Ground taxiing and turning including sloped surfaces
Prevent takeoff if safe takeoff conditions are not met
Unmanned landing and takeoff
Shipboard landing and takeoff All integrators within FBW control laws are configured to progress between any of the following conditions: normal, washed out, or grounded. Integrators are normal when in flight. When rotorcraft 11 touches the ground and/or lands, integrators are washed out or grounded. Controller 30 employs a combination of information from sensors, logic management system 118, and aircraft flight information to regulate the FBW control law integrators on each individual axis as being either grounded or washed out at the appropriate time and in the appropriate axis. The axes are longitudinal, lateral, pedal, and collective.

Logic management system 118 includes a score management logic 134 and a sensor logic 116. Logic management system 118 is in communication with sensors and controller 30, such that logic management system 118 receives and processes data from the sensors in order to classify the flight status, or mode, of rotorcraft 11. Logic management system 118 transmits a signal to controller 30 to regulate the integrators within FBW control laws to regulate the control authority provided to a pilot. It is important to note that the degree of control authority provided depends upon the flight status of rotorcraft 11 determined from sensors and logic management system 118. For purposes of this application, system 101 will use weight-on-gear (WOG) sensors 127 and radar altimeter 128 in combination with logic management system 118. Furthermore, sensor logic 116 may receive information from a plurality of sensors, thereby necessitating the ability of sensor logic 116 to consist of any number of individual logics. For example, in this present application, WOG sensor logic 132 and radar altimeter assistance logic 122 are each contained within sensor logic 116.

As seen in particular in FIG. 4, the takeoff and landing sequence of rotorcraft 11 is illustrated. The takeoff sequence 105 is depicted on the left side of FIG. 4. As rotorcraft 11 performs takeoff sequence 105, rotorcraft 11 begins initially in a pre-takeoff protection mode 107 and then proceeds into an on-ground mode 109, air/ground transit mode 111, and finally an in-flight mode 113. A landing sequence 115 is depicted on the right side of FIG. 4. As a rotorcraft 11 performs landing sequence 115, rotorcraft 11 begins initially in an in-flight mode 117 and proceeds into an air/ground transit mode 119, an on-ground mode 121, and finally to a touch down protection mode 123. As seen in FIG. 4, modes 109, 111, 119, and 121 define a transit region 125. Within transit region 125, rotorcraft 11 may transition from any mode 109, 111, 119, 121, to any other mode 109, 111, 119, 121. Such transitions may result in rotorcraft 11 transitioning between sequences 105 and 115.

During an initial pre-takeoff protection mode 107, all integrators within FBW control laws are in the washout mode and rotorcraft 11 is in on ground mode 109. Rotorcraft 11 is prevented from takeoff unless pre-takeoff conditions are met. These pre-takeoff conditions may include at least any of the following:

Proper percentage of RPM
Engine in normal operation region
Proper collective takeoff position
All other preflight checks are passed
Torque value not higher than a pre-defined value, such as 90% or 95%

In instances where the engine torque is higher than 80%, rotorcraft 11 may experience some limitations, such as the ability to perform a short-run takeoff instead of vertical takeoff for example. Collective control determines the aircraft pre-flight logic management for takeoff. Once the pre-takeoff conditions are met, rotorcraft 11 will be ready for takeoff operation. During proper takeoff conditions, when the pilot increases the collective level, controller 30 moves the vertical integrators out of washout mode to on-ground mode in preparation for changing all integrators into normal in-flight operation mode.

During the takeoff operation, rotorcraft 11 initially has all integrators in a down or grounded mode for all four control axes. When the pilot increases collective level to the nominal take-off RPM, takeoff and lift off, controller 30 is configured to have all axial integrators switch off from washout mode and become on ground mode. This protection function is to have rotorcraft 11 ready for takeoff. As rotorcraft 11 proceeds through transit region 125 to in flight mode, the control authority 130 from individual axial control axes are gradually increased, as seen in FIG. 3. The control authority 130 from the individual axes can be longitudinal control authority 130*a*, lateral control authority 130*b*, vertical control authority 130*c*, and pedal control authority 130*d*. Depending on the condition changes during takeoff, system 101 gradually brings rotorcraft 11 from on-ground mode 109 to in-flight mode 113 in normal operation conditions by giving the pilot increasing amounts of control authority 130 via the control authority integrator loops. When rotorcraft 11 reaches in-flight mode, system 101 gives full control authority 130 to the pilot or unmanned system.

During the approach and landing flight regime of sequence 115, all integrators shall be in normal operation when the aircraft is in the in-flight mode 117. At this stage, all four axial controls have full authority. The axial controls refer to longitudinal, lateral, collective, and pedal controls. Depending on aircraft states (airspeed, ground altitude, pitch angle, and bank angle), WOG sensor 127 information, and radar altimeter 128 inputs, the aircraft can perform at least any of the following:

Normal run-on landing
Normal hover landing
Sloped surface run-on landing
Sloped surface hover landing During the landing sequence 115 system 101 gradually decreases the control authority 130 of the pilot from rotorcraft 11, based upon on WOG sensor state conditions 131 (see FIG. 5) and logic 132. During landing sequence 115, rotorcraft 11 is initially in in-flight mode 117 with all gears in-air condition. As rotorcraft 11 proceeds through transit region 125, control authority 130 from individual axial control axes are gradually decreased, as seen in FIG. 3. For example, as one wheel is in-touch with the ground, one or more single axial control authorities will be removed by grounding their respective integrators.

Timing the final touch down protection mode 123, a hysteretic design, with all control positions, is added to protect rotorcraft 11 frequent on/off flight performance. Instead of grounding integrators from all axial control authorities, the washouts of individual integrators are employed to transition rotorcraft 11 back to its un-forced conditions for all actuators. This mode is activated only when aircraft is ready to shut down and RPM is reducing.

FIG. 3 illustrates a schematic of system 101 having WOG sensors 127, radar altimeter 128, WOG logic 132, radar altimeter logic 122, score management logic 134, and controller 30. In order to select the appropriate time and axis, system 101 relies upon WOG sensors 127 and logic management system 118 to provide controller 30 with information as rotorcraft 11 transitions between in-flight mode 113, 117 and ground mode 109, 121 (see FIG. 4). During this transitioning phase of flight, system 101 is configured communicate with rotorcraft 11 control systems to provide selected automated control.

There are two conceptual algorithm methods to aid the touchdown protection system. One is to use the time delay to release rotor lift and the other is to use the process to slow down the rotor dynamics depending on collective level position. The methods are Establish a time delay (how many seconds later to start the process), or Use process/algorithms to immediately start the touch down process, the process/algorithm designs depend on collective level position.

In this patent application, both methods are implemented to consolidate the entire design.

A delay 106 is used in landing sequence 115. Delay 106 is a predetermined period of time that must pass before integrators are washed out during a landing maneuver. Delay 106 is activated when rotorcraft 11 is in on ground mode. If rotorcraft 11 remains in an on ground mode after the delay, the integrators are grounded and washed-out, including vertical integrators. A delay may be a two-second timer, for example. Any time limit may be used and may be adjustable by a pilot in selected embodiments. Delay 106 is programmed into system 101 to allow the pilot to change the landing spot and/or perform touch-and-go and similar maneuvers. When rotorcraft 11 is in on ground mode 109 in sequence 105, all integrators are washed out and no delay is used during takeoff.

It is important to note that as rotorcraft 11 proceeds through sequence 105, the degree of control authority 130 granted to a pilot is increased. Likewise, as rotorcraft 11 proceeds through sequence 115, an increasing amount of control authority 130 is removed from the pilot and retained by system 101. Regulating control authority 130 of the pilot during sequences 105, 115 are configured to protect rotorcraft 11 during transitions between modes 107, 109, 111, 113, 117, 119, 121, 123. This regulation of control authority protects rotorcraft 11 during takeoff, landing, and ground operation.

In particular to FIG. 5, system 101 may use any number of instruments and/or sensors to properly classify the mode of rotorcraft 11. As stated previously, rotorcraft 11 will use WOG sensors 127 and corresponding WOG logic 132 information, along with radar altimeter 128 and radar altimeter logic 122 within FBW control laws. WOG sensors 127 have a plurality of states within each individual tricycle gear. The term "state", with regard to WOG sensors 127, refers to a distinction concerning an amount of force acting on the landing gear. For example, each state may refer to a range of forces exerted on the landing gear.

A plurality of states and a plurality of landing gear produce multiple WOG state combinations 131 when combined. For example, in a tricycle landing gear as in the present application, if each gear has three possible states, that allows for a total of twenty-seven total combinations 131 for the landing gear.

It is understood that system 101 may use one or more states per landing gear. It is also understood that WOG logic 132 and the use of radar altimeter logic 122 are not meant to be limiting. Other systems within rotorcraft 11 may be used to form the necessary logic within system 101 to classify the proper mode of rotorcraft 11. As described in the present application, radar altimeter 128 is used within system 101. It is understood that embodiments of system 101 may use radar altimeter 128 and radar altimeter logic 122 simultaneously with WOG sensors 127 and logic 132 or as a secondary backup system in case of WOG sensor 127 failure. Furthermore, system 101 may be configured to use only radar altimeter 128 or other aircraft control systems on rotorcraft 11 to provide the necessary inputs to controller 30.

FIG. 3 shows the control authority variations within system 101 depending on WOG logic 132 and/or radar altimeter logic 122 with respect to in-flight mode 113, 117, transit mode 111, 119 and on-ground mode 109, 121. It is shown that during transit region 125, the individual full authority control reduces to partial authority depending on the WOG logic 132. Integrator control authority loops 130 (longitudinal 130a, lateral 130b, collective 130c, and pedal 130d) are illustrated as having partial control in transit mode and fully authorized in in-flight mode 113, 117.

As discussed previously, system 101 is configured to ground respective integrators during sequences 105, 115 according to WOG sensor state combinations 131 (see FIG. 5). WOG state combinations 131 determine when and whether individual integrators in each axis are switched between normal, grounded, or washed-out conditions. For example, during a landing, when rotorcraft 11 WOG sensors 127 are on ground for more than two wheels, the respective individual axis integrators are grounded to avoid actuator run-out. Depending on collective level and other flight state information associated with WOG signals 129, rotorcraft 11 can either be in transit region 125, touch down protection mode 123, or pre-takeoff protection mode 107.

In particular to FIG. 5, a summary of the WOG sensor logic 132 is illustrated. As stated previously, in order to regulate the control authority 130 correctly, system 101 is configured to determine and classify the flight status of rotorcraft 11 as being in at least one of the following modes: in-flight mode, in air/ground transit mode, and on-ground mode. Logic management system 118 is programmed into system 101, so as to determine and classify when rotorcraft 11 transitions between modes.

In the preferred embodiment, WOG logic 132 is programmed to use data, such as force data, collected from the landing gear through WOG sensors 127 to determine the state of that individual landing gear. Each landing gear has an associated WOG sensor 127. Each WOG sensor 127 is configured to transmit and register the individual state of that landing gear to WOG logic 132 at any given time. WOG sensor 127 can register any of the following states: in-flight, in-touch, and on-ground. WOG logic 132 is configured to process the data collected from WOG sensors 127 and transmit the data through score management logic 134 to controller 30. The determination of when rotorcraft 11 transitions between in-flight mode 113, 117, air/ground transit mode 111, 119, and on ground mode 109, 121 depends upon WOG sensors 127 and WOG logic 132. The mode of rotorcraft 11 determines the integrator logic 133 actions that system 101 performs with the integrators to regulate control authority 130.

FIG. 5 illustrates WOG state combinations 131 representative of all twenty-seven combinations (three landing gear having three possible states). Also, corresponding integrator logic 133 actions by controller 30 are listed according to respective state combinations 131. As integrators are grounded or washed out, the feel of the controls within rotorcraft 11 are adjusted so as to assist the pilot in recognizing the mode of rotorcraft 11.

Figure 6:
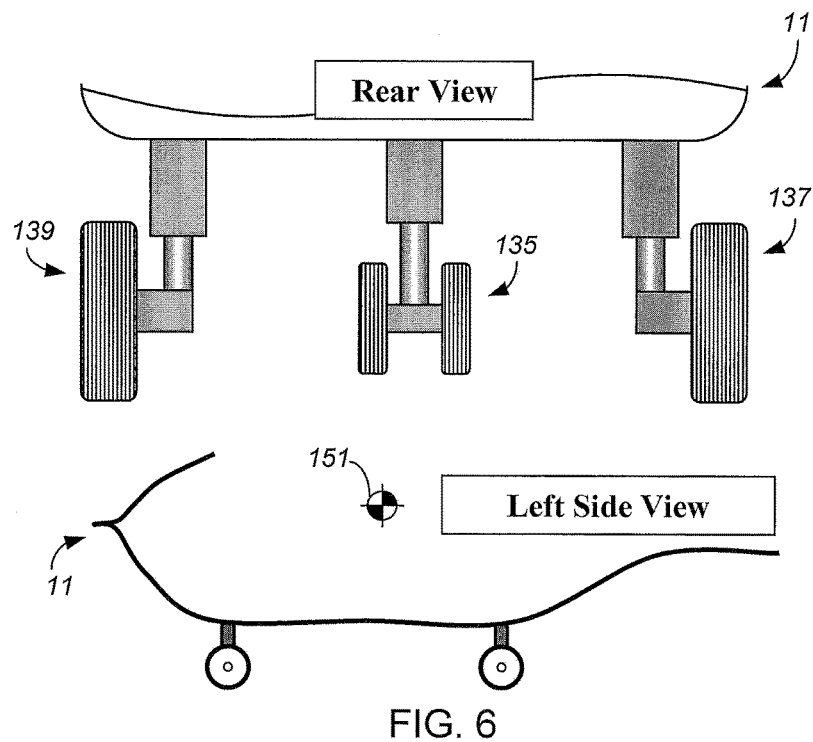
FIG. 6 is a side and rear view of the rotorcraft of FIG. 1 having a tricycle landing gear.

Referring now also to FIGS. 6-100 in the drawings, the method of determining the WOG state combination 131 and the corresponding score transmitted to score management logic 134 is illustrated. As noted previously, although rotorcraft 11 is depicted in FIG. 1 as having skids, the present application will assume the use of a tricycle landing gear having a nose gear 135, a right main landing gear 137, and a left main landing gear 139, as seen in FIG. 6. It is understood that aircraft may use more or fewer landing gears. System 101 is adaptable to handle any number of landing gears having any number of WOG states 131.

WOG sensors 127 can be designed to serve more than the singular function of measuring when rotorcraft 11 is in on ground. WOG sensors 127 can have multiple signals such that system 101 can recognize that rotorcraft 11 has a single gear in down position or (x,y,z) touch positions. To distinguish the difference between touch and down position, the total force of wheels from the (x,y,z) direction is calculated. The sum of (x,y,z) force is used to determine the down position.

Recognizing and distinguishing a single gear in on-ground, touch mode, or down position has become a critical condition in rotorcraft FBW collective control. As stated previously, it is important to select the appropriate time and axis for grounding or washing out FBW control law integrators. Since the FBW collective controller is a full-authority SCAS design, many integrators in the collective control loop can cause the collective actuator to run-off during touchdown if no proper action is taken. To avoid the integrator run-off and loss of control during WOG touch or down status, the associated integrators on each axis must appropriately be either washed-out, or grounded, or re-initiated from on to off mode. Similarly, any integrators in lateral, longitudinal and direction axes can also require the correct logic management to avoid the individual axial control actuator from loss-of-control because of control law integrators wind-up. To avoid washing out integrators too quickly/slowly or grounding the integrators at unwanted conditions, the pilot control inputs can be appropriately limited. Pilot induced oscillation (PIO) may occur if proper WOG logic management is not provided in control law design.

Figure 8:
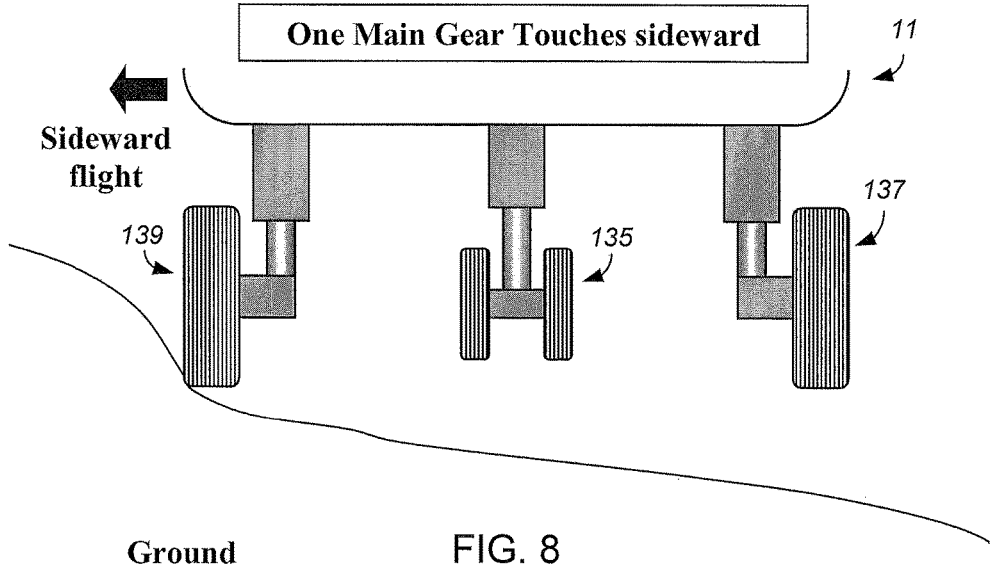
FIG. 8 is a rear view of the rotorcraft of FIG. 1 in an exemplary position to experience the forces of FIG. 7.

FIG. 7 shows the relationship of the main landing gears with respect to rotorcraft's 11 center of gravity 151 (C.G.) as well as the calculated forces 91 that may act upon rotorcraft 11 in a representative steady state sideward flight. For example, as seen in FIG. 8, when left main wheel 139 is touched and down, the possibility of a force acting upon left gear 139 may cause rotorcraft 11 to flip over. Depending on the C.G. 151 of rotorcraft 11, the rolling, yawing and pitching moments can be generated by a single wheel touch condition. If the amplitude of the touch force is too high before the corresponding integrator in the FBW control law system is washed out, the aircraft may flip over. This is because the wheel point has become a pivot point to cause some of the integrators in the control laws to wind up. Furthermore, such a condition may cause actuators associated with the FBW control law system to diverge. To avoid these situations from occurring, it is necessary to properly ground or wash out the associated integrators (longitudinal, lateral, pedal, and/or collective) in the control laws. WOG logic 132 is configured to correctly time the correct mode 109, 111, 119, 121 such that the aircraft will not lose performance and PIO will not occur.

Figure 9:
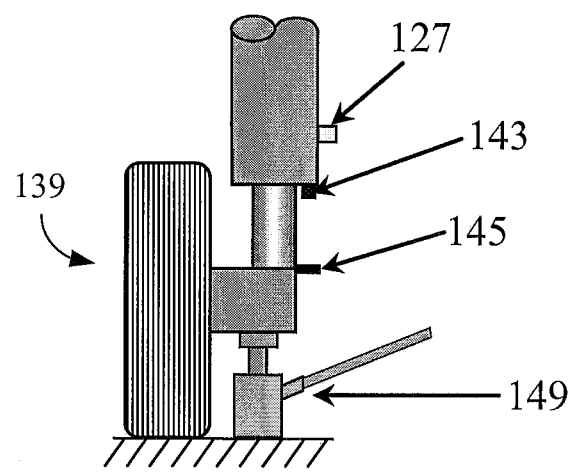
FIG. 9 is a partial rear view of a single landing gear of FIG. 6 having assorted sensors to determine the state of the landing gear.

FIG. 9 illustrates one possible method to obtain three states (i.e., on-ground, touched and in-flight) from WOG sensor 127 to select the appropriate time and axis for grounding or washing out FBW control law integrators. In FIG. 9, there are two sensors in communication with landing gear 139. The first sensor is a WOG sensor 127. The second sensor is a proximity sensor 143. The proximity sensor 143 is paired with a metal bracket 145 installed on the wheel support metal, so as to measure changes in distance between proximity sensor 143 and bracket 145. A wheel jack 149 can be used to calibrate the distance range with a corresponding level of engagement force applied to landing gear 139. The states of WOG sensor 127 may be formed by setting selected distances to correspond to each state. For example, the distance between proximity sensor 143 and bracket 145 can be set from open (0 Lbs) to a distance corresponding to an engagement force of 250 Lbs. Many factors may affect the value of the engagement force. Factors may include changes depending on size of rotorcraft 11, the friction of the ground, wheel weight, and distance from gear 139 to the C.G. 151 of rotorcraft 11. This value may need to be determined through flight test.

Alternative embodiments may use a tire pressure system within the tire of landing gear 139 to measure the pressure changes in order to detect an engagement force applied to the tire. Other methods are possible and are considered within the scope of this application that use one or more sensors or devices to evaluate mode 113, 117, 109, 111, 119, 121 of rotorcraft 11 based upon forces acting upon a portion of rotorcraft 11.

It is important to remember that the WOG state combinations 131 are used by system 101 to determine the mode of rotorcraft 11. The WOG state combination 131 and associated integrator logic 133 is shown in FIG. 5. System 101 includes a WOG logic 132 arrangement to assess the state of each landing gear 135, 137, 139. As an example, In-flight refers to conditions where the gear is clear of the ground and no force is exhibited on the gear. In-touch refers to conditions where the gear is in-touch with an object, such that the engagement force is within the touch region, between 0-250 lbs. On-ground refers to conditions where the engagement force exceeds the touch state. For example, the engagement force for On-ground state can be greater than 300 lbs. Between 250 and 300 lbs, a hysteretic design is applied. The hysteretic design is arbitrary and may be different with different aircraft.

Once WOG sensors 127 and logic 132 are programmed with appropriate ranges for the respective states, system 101 employs a purely mathematic method performed by WOG logic 132 to determine the WOG state combination 131. Each gear state 131 is assigned an integer value associated with its condition. This integer value is referred to as an individual score. Each WOG sensor 127 produces an output signal 129 that includes data containing the integer value or score representing the state condition 131 of each landing gear 135, 137, 139. For example, in-flight state condition=0, in-touch state condition=1, and on-ground state condition=3. In instances where a gear is down (on-ground), the gear will also be in-touch. Landing gear must touch before considered to be in an on-ground state. Therefore, the score of a down signal is 3. WOG logic 132 is configured, such that when the gear is touched and down, the score will be three, even if the gear touch sensor is failed or absent.

Each landing gear is defined as a variable (A, B, C), for example, where A=the nose gear 135, B=the left main gear 139 and C=the right main gear 137. Each gear (A, B, C) can score either the value of (0, 1, or 3) depending on the state condition 131. WOG logic 132 totals the individual scores, or output signal 129, from all WOG sensors 127 from each landing gear (A, B, C) and transmits a total score 126 to score management logic 134. Score management logic 134 receives total score 126 and determines the mode 113, 117, 109, 111, 119, 121 of rotorcraft 11 as seen in FIG. 4.

Score management logic 134 determines the mode 113, 117, 109, 111, 119, 121 based upon the following mathematical equations. Where $A+B+C \geq 4.5$, rotorcraft 11 will be on ground mode 109, 121. Where $A+B+C \leq 0.5$, rotorcraft 11 will be in-flight mode 113, 117. For all conditions where $0.5 < A+B+C < 4.5$, rotorcraft 11 is in air/ground transit mode 111, 119. One exception exists. As long as one gear is down and another gear is in-touch, the desired logic assumes that rotorcraft 11 intends to be in an on-ground mode and will therefore communicate that intent to controller 30 through score management logic 134. Such an exception can be seen in status conditions 7, 8, 14, 15, 20, and 21 in Tables I, II, and III. All twenty-seven cases of in-flight, in-touch and on-ground modes are shown in Tables I, II and III, illustrated in FIGS. 10A-10C respectively.

In FIGS. 10A-10C, In-Touch indicates that the aircraft is in air/ground contact transit mode 111, 119. The individual axial integrators to be grounded are shown in FIGS. 3 and 5 for partial control. Tables I, II, and III illustrate the state of each landing gear 135, 137, 139 along with the associated score 126. Score 126 is transmitted from logic 132 to score management logic 134 for processing. Based upon score 126, score management logic 134 transmits a signal 120 to controller 30 for regulating control authority 130.

It is important to note that system 101 can be used with traditional WOG systems where WOG sensors 127 are defined as being On or Off. WOG logic 132 and score management logic 134 would still apply. This is because the touch signal is in an absent condition. Therefore, conventional landing gear design is a subset of this design. Furthermore, controller 30 may be an existing flight control computer on rotorcraft 11. In such an example, the logic within system 101 may be incorporated into the existing systems of rotorcraft 11. This feature permits system 101 to be integrated within existing aircraft FBW control systems without modifications, as in a retrofit for example.

Although depicted with three separate landing gears, it is understood that system 101 may use any number of landing gears. Additionally, other types of landing gear may be used, such as skids for example. The integer values for each state may vary depending on design considerations and the solution of each case will still be unique. However, care should be taken when determining the value of the states so as to allow FBW control law integrators the ability to perform as desired. For example, if the score, or output signal 129, of (touched, down) signals are set to be either (1, 1) or (1, 2), the solution will not be unique. Mathematic methods for all combinations such as the above descriptions are all considered within the scope of this application.

Additionally, it is understood system 101 may use other systems or sensors, apart from WOG sensor 127, to determine the mode of rotorcraft 11. Other embodiments may use more or less WOG sensors 127 for an individual landing gear. The ranges of force and the respective states 131 may be broadened or narrowed so as to include more or less states 131.

Examples of system 101 in operation are as follows: A single wheel touched or down function design is to assist the aircraft to land on sloped ground conditions. It will also allow rotorcraft 11 to perform landing one wheel on a building to load or unload customers and/or material. In addition, the pilot will be able to perform one wheel touch maneuver; because only selected associated axial control authorities are reduced.

In another example, when any two wheels are in-touch, it is assumed that the rotorcraft pitching angle and bank angle are within a very small angle. Therefore, all four axial control authorities are reduced but not washed-out yet. As stated previously, when at least one wheel is fully down and any of the other wheels are touched, this implies the third wheel is very close to the touched condition or already touched or down, therefore system 101 will trigger score management logic 134 to register a condition of on ground mode. Therefore, rotorcraft 11 will always land approximate to the ground level angle even on sloped ground.

The modes 113, 117, 109, 111, 119, 121 for rotorcraft 11 within system 101 can be summarized into the following aspects:

In-Flight mode: Defined as neither gear-touched nor gear-down condition. In-Flight mode is defined when aircraft is in-flight and all gears are neither in-contact nor down condition. In this mode, all integrators are operating normally. It is normal flight mode for pilot operation or unmanned flight.

Air/Ground Transit mode: Defined as at least one gear either touched or down but not two or all gears down. Air/ground transit modes are assumed that the aircraft can be either in-transit mode or single gear ground mode or transit between in-flight, or gear-touched or gear-down conditions. It can be single gear touched and/or down mode or multi-gear touch and/or down mode before two second period delay triggers. During combination of these conditions, the control laws integrators are either grounded or washout, depending on gear associated conditions with flight states.

On-Ground Mode: Defined as all gears down. On-ground mode is assumed that the aircraft has two or all gears down. The logic of this mode is operating differently. In the first two seconds of all gears down, all integrators of each loop remain grounded. Either:
a) engine torque or power dropped more than 10% off the required take off value, or
b) collective level dropped off takeoff region and all other three controls are in-detent positions, and
c) condition (a)+(b) and 2 seconds timer is triggered
All integrator values on longitudinal, lateral, pedal and collective loops will start washing out their values. This logic is to protect the aircraft from on-off air-ground contact flight or protect the pilot for selecting landing point flight.

System 101 is classified into six basic WOG state combinations 131 as shown in FIG. 5. These six combinations 131 and their respective score 126 according to WOG logic 132 are summarized as the following:

(a) Neither wheels touched nor down: (In this case, A+B+C=0.)
(b) Any single wheel touched only: (In this case, A+B+C=1.)
(c) Any two wheels touched: (In this case, A+B+C=2.)
(d) All three wheels touched: (In this case, A+B+C=3.)
(e) Any single wheel down: (A+B+C=3)
(f) Any single wheel touched and another wheel down: (In this case, A+B+C=4.)

Note that signals of (A, B, C) represent that same gear as noted previously. Also, where at least two wheels are down, the score 126 is greater than 4.5. In (f) above, despite score 126 being less than 4.5, it is understood that system 101 will consider the mode of rotorcraft 11 to be grounded in such a state combination 131.

This innovative mathematic method has made the entire logic design very flexible, robust and easy to be integrated. Whatever the scores are to determine the on-ground and/or transit logic, the mathematic method has made the entire design a unique solution.

A purpose of designing system 101 for FBW advanced control laws is to consolidate the takeoff and landing sequences 105, 115 during the ground operation and/or touchdown protection 123 and/or pre-takeoff protection 107. System 101, as shown in FIGS. 3 and 4, contain two sequences 105, 115.

Figure 11:
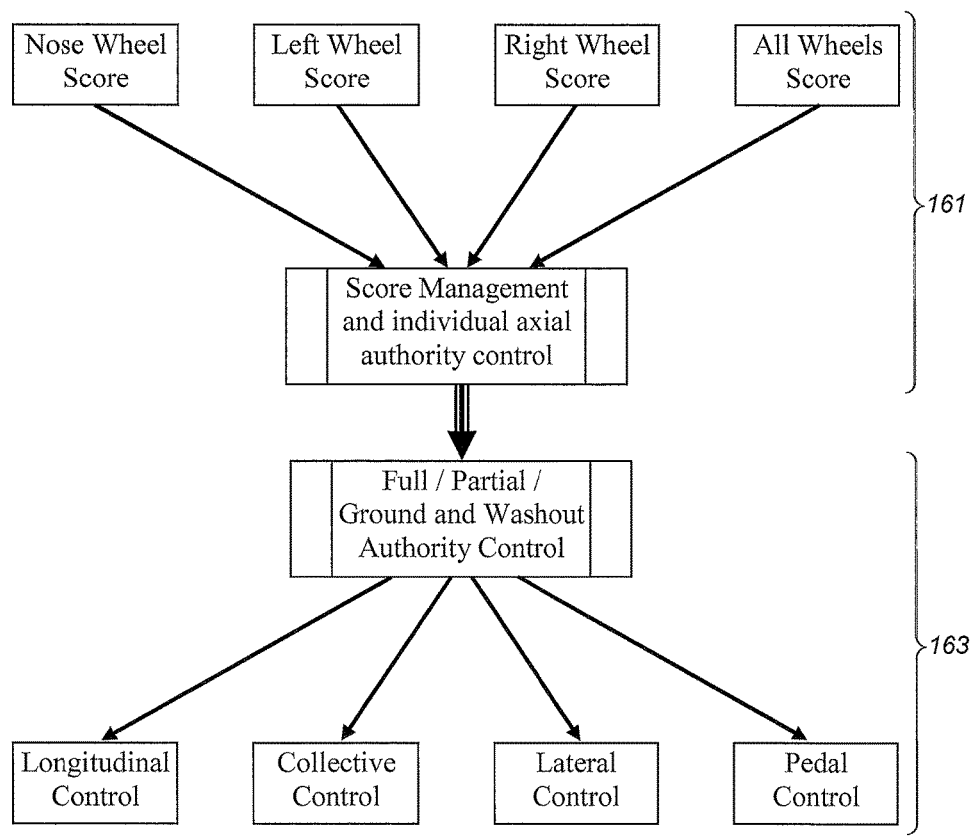
FIG. 11 is a flow chart of the system of FIG. 1 using the scores from the landing gear as seen in FIGS. 10A-10C to regulate the control authority of the rotorcraft of FIG. 1.

Referring now also to FIG. 11 in the drawings, a flow chart of individual WOG scores 161 and associated axial control authority 163 are illustrated. Control authority from in-flight to air/ground transit and then to ground mode shall be subject to change depending on WOG states 131. All WOG state conditions 131 from single wheel touched to all wheels down are categorized into the following ten conditions based upon the condition of each respective landing gear 135, 137, 139. The respective integrator logic 133 is also listed for each condition below.

Condition 1: Left wheel touched but not down—This is in the transit mode. At this mode, lateral and directional integrators are grounded but not washed-out. Lateral and directional controls retain partial authority, by reducing control error input gains to be 50% for single left wheel touch flight.

Condition 2: Left wheel touched and down—This is also in the transit mode. At this mode, lateral and directional integrators are washed-out and switched to baseline mode. Directional control is grounded to avoid excessive heading changes instantly.

Lateral and directional controls retain partial authority, by reducing control error input gains to be 30% for single wheel down flight.

Condition 3: Right wheel touched but not down—This is in the transit mode. In this mode, lateral and directional integrators are grounded but not washed-out. Lateral and directional controls retain partial authority, by reducing control error input gains to be 50% for single right wheel touch flight.

Condition 4: Right wheel touched and down—This is in the transit mode. At this mode, lateral and directional integrators are washed-out and switched to baseline mode. Directional control is grounded to avoid excessive heading changes. Lateral and directional controls retain partial authority, by reducing control error input gains to be 30% for single wheel down flight.

Condition 5: Nose front wheel touched but not down— This is in the transit mode. In this mode, longitudinal integrators are grounded but not washed-out. All other three axial controls retain full authority. Longitudinal control reduces error input gains to be 50% for single nose wheel touch flight. In this mode, the aircraft can still maintain the low-speed forward flight.

Condition 6: Nose wheel touched and down—This is in the transit mode. At this mode, longitudinal integrators are washed-out and switched to baseline mode. Collective control is grounded to avoid conflict between longitudinal and vertical controls and the other two axial controls retain full authority. Longitudinal control reduces control error input gains to be 30% for single wheel touch flight, while vertical control maintains full authority for on/off functions.

Condition 7: Nose wheel and right wheel touched but not down—This is in the transit mode. At this mode, lateral, directional and longitudinal integrators are grounded and switched to their baseline modes. Collective control is grounded to avoid conflict between longitudinal and vertical controls. Lateral, directional and longitudinal controls retain partial authority. These control error input gains are reduced to be 50% for dual wheel touched flight, while vertical control maintains full authority for on/off functions.

Condition 8: Nose wheel and right wheel touched but not down—This is in the transit mode. At this mode, lateral, directional and longitudinal integrators are grounded and switched to their baseline modes. Collective control is grounded to avoid conflict between longitudinal and vertical controls. Lateral, directional and longitudinal controls retain partial authority. These control error input gains are reduced to be 50% for dual wheel touched flight, while vertical control maintains full authority for on/off functions.

Condition 9: Left wheel and right wheel touched but not down—This is in the transit mode. At this mode, lateral, directional, longitudinal and vertical integrators are all grounded and switched to their baseline modes. Lateral, directional, longitudinal and vertical controls retain partial authority. Lateral and directional control error input gains are reduced to be 30% for dual wheel touched flight. Longitudinal and vertical control error input gains reduce to be 50%. Quickness of vertical and longitudinal control will be reduced to partial authority for on/off functions.

Condition 10: All three wheels touched only and not down—This is in the transit mode. At this mode, lateral, directional, longitudinal and vertical integrators are all grounded and switched to their baseline modes. Lateral, directional, longitudinal and vertical controls retain partial authority. Lateral, directional longitudinal and vertical control error input gains are reduced to be 30% for three wheel touched flight. Quickness of vertical control will be reduced even more to partial authority for on/off functions.

Condition 11: On Ground Mode—The condition of at least one wheel down and one wheel touched is considered as on-ground mode. Any indications of more than the above combination are considered as on-ground. On the ground mode, the flight control authority will be grounded first and wait for the two-second timer to be triggered. After timer is triggered, the washout process starts. This process will help to protect the "touch and go" flight maneuver.

As stated previously, in the special condition when one wheel touches first and then down, the control laws will automatically take care of this situation by reducing authority based on the associated wheel control authority. Similarly, when two wheels are touched first and then down, the flight control laws will automatically handle this situation. When two wheels touch, it is assumed that rotorcraft 11 is approximately wing level. If a sideward ground velocity sensor is available, its logic will be combined into system 101 design.

The mathematical summary of the above ten conditions is shown in FIG. 3 for partial-authority control transit mode. In FIG. 11, it is shown that the control authority of each wheel's touched and down signals is computed through the score management logic 134 depending on the location of the landing gear as noted by 161. Score management logic 134 receives both output signals 129 for each landing gear and also the total score 126. Score management logic 134 is in communication with controller 30. The control authority 130 will individually be regulated within each integrator as a result of the individual landing gear states as noted by 163. The authority of each wheel will be grounded first and starting at full authority to 50% authority and then 30% authority. After that, the aircraft will start to washout the longitudinal and vertical integrators. Note that the washout process for lateral and directional controls is different from longitudinal and vertical axes. The reasons for setting them different are to:

(1) Avoid lateral and directional control authority remaining too large during the touch and down functions
(2) Maintain greater longitudinal and vertical authority such that aircraft can remain responsive for takeoff or landing
(3) Avoid any lateral pivot point which could cause aircraft to flip-over on uneven ground The percentage of authority reduced from 100% to 50% and then 30% is arbitrary based on the pilot control feel. For commercial aircraft, these values are suggested to be reduced further. The percentage of reduced authority can be changed to any combination depending on the flight test. It may also drop to 10 to 15% for the on-ground mode which results in the same set up as partial authority control system. It may also change with respect to combinations of longitudinal, lateral, pedal and collective loop 130a-d to be the five states of control power arrangements or more. However, for military aircraft, these values may need to be set as is, or higher. The other reason to demonstrate the different authority is to instantaneously make the pilot feel the difference in each condition. Therefore, the pilot knows he is in either touch or down position.

The ground and washout logic management can also be changed. In the current logic design, the top priority for safety is to avoid rotorcraft 11 creating a pivot point when a single wheel is touched or down. For an inexperienced pilot, this logic design will help avoid aircraft accidents by reducing control authority. For highly experienced pilots, they may feel aircraft is not agile enough during the touch and go function. However, the pilot feel may be tuned by the grounded and washed-out sequences and also the control input error gains. This score management logic 134 is flexible enough to satisfy either military or commercial pilots.

As stated previously, system 101 uses WOG logic 132 and radar altimeter logic 122. In the preferred embodiment, radar altimeter 128 and logic 122 are used in case of failure of WOG logic 132. Therefore the features and limitations of radar altimeter 128 and logic 122 are similar to that of WOG sensor 127 and logic 132. Radar altimeter 128 and logic 122 are in communication with score management logic 134 as well. However, radar altimeter 128 and logic 122 may be used in conjunction with WOG sensors 127 and logic 132 in other embodiments.

A WOG sensor 127 failure mode is taken into account in the present application. Usually, FBW WOG sensor 127 failure rate is set as low as $10^{-9}$. However, a special condition, such as all wheels in the water, landing gear broken, or gear not locked down, will cause WOG sensor 127 to fail. In such occasions, the logic 122 design of the radar altimeter value for WOG sensor 127 failure consideration plays a very important role. Radar altimeter assistant logic management design can be used to help consolidate the touch down protection system design for WOG sensor 127 failure consideration.

The WOG default mode condition activates when all or a partial number of WOG sensors 127 in rotorcraft 11 have failed, whether from system errors, battle damage, or other un-recoverable reasons, for example. It is important to select the best default mode for advanced flight control laws, such that the integrator run-off situation will be avoided and the entire flight control system's gain margin, phase margin and bandwidth are within handling qualities. The normal flight conditions of in-flight mode, in-transit mode, and on-ground mode can be designed for strong wind conditions for low-speed to mid-speed landing. In order to provide rotorcraft 11 with similar performance for default mode operation even if all WOG sensors 127 are failed, radar altimeter assistant logic management design is introduced. Within an altimeter assistant logic management design are radar altimeter 128 and radar altimeter assistance logic 122. Radar altimeter assistant management for WOG sensor 127 failure condition for the transit mode is altered as described below:

(1) On longitudinal axis: all longitudinal loop integrators are grounded with all normal switches on (2) On the lateral axis: all lateral loop integrators are grounded with normal switches on
(3) On pedal axis: all pedal loop integrators are grounded with normal switches on
(4) On collective axis: all vertical loop integrators are grounded with normal switches on. In addition, collective force trim release (FTR) switch can be in normal operation.

Note that when rotorcraft 11 touches down during default mode operation, regardless of whether collective FTR is pressed or not, rotorcraft 11 can safely transfer to the ground mode.

Figure 13:
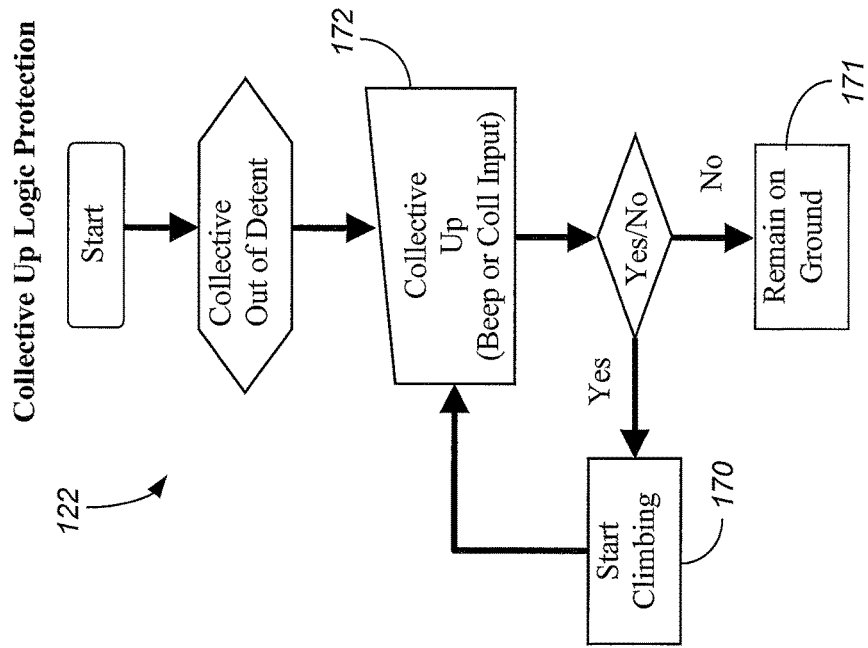
FIG. 13 is a chart of radar altimeter assistance logic for collective up logic protection as used in the system of FIG. 1.
Figure 12:
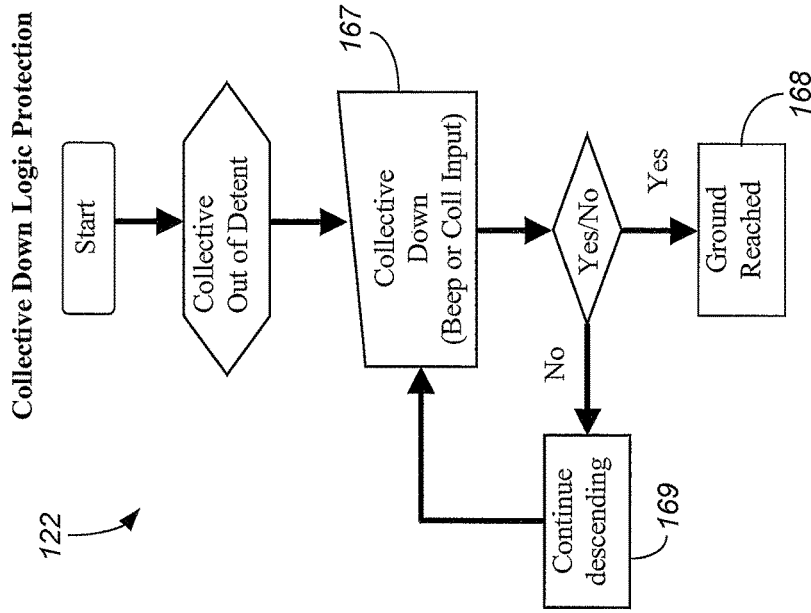
FIG. 12 is a chart of radar altimeter assistance logic for collective down logic protection as used in the system of FIG. 1.

Referring now also to FIGS. 12 and 13 in the drawings, the radar altimeter assistance logic 122 design is illustrated. WOG sensor 127 failure protection is implemented by using radar altimeter 128. When radar altimeter 128 is healthy, radar altimeter logic 122 is employed to enable robust collective air/ground touchdown protection during WOG sensor 127 failures. This design operates as a double-check system for scoring. As seen in FIG. 3, radar altitude sensor output 165 is transmitted from radar altimeter 128 to radar altimeter assistance logic 122. The radar altimeter assistance logic 122 design monitors the potential errors in sensor output 165.

To avoid the signal on/off triggering in logic 122, the hysteresis design between landing and takeoff logic protections is integrated into a plurality of signals. Such signals may include radar altitude reading and a number of error signals. The error signals act as a filter to help to remove drift from the radar altitude. If the radar altimeter sensor is not corrected by the filter system, a high drift error rate, greater than 0.25 feet per minute for example, would need to be taken into account for logic protection design.

The combination of FIGS. 12 and 13 is called radar altimeter assistance logic 122. This logic 122 design is used to determine in-flight and on ground status, during landing or takeoff sequences, particularly for WOG sensor failure conditions. FIG. 12 illustrates logic 122 for collective down logic protection. FIG. 13 illustrates logic 122 for collective up logic protection. In FIG. 12, the total vertical gear height from C.G. 151 is determined to be a selected distance. For example, the gear may be a distance of 6.5 feet from the gear to C.G. 151. In this example, if the collective is down 167 and the radar altitude reads less than 6.5 feet, rotorcraft 11 is treated as grounded 168. However, if radar altitude reads greater than 6.5 feet, rotorcraft 11 continues to descend 169. With respect to FIG. 13, when in a collective up condition 172, if logic 122 detects that the radar altitude is greater than 9.5 feet, then rotocraft 11 continues to climb 170. However if the radar altitude is less than or equal to 9.5 feet, logic 122 treats rotorcraft 11 as remaining on ground 171.

In sloped landing conditions, radar altitude can drop below 6.5 feet, due to pitch and roll angular effects to radar altimeter 128. However, slope angles are limited by 10 degrees for a traditional sloped landing envelope. Therefore, the absolute values of the above two generated angles are used for logic design. Although it is assumed the total gear height from vertical C.G. 151 is approximate 6.5 feet above the ground, it is understood that this may be modified for different aircraft.

After finishing all logic arrangement designs, control authorization from in-flight mode to transit-mode and then to on-ground mode must be gain scheduled with respect to ground speed. A hover condition is defined when ground speed is lower than certain threshold, for example, less than 3 knots. In this condition, the aircraft is ready for hover landing. The maneuverability close to the ground is limited. Therefore, the method of reducing the full authority control laws design is different from the run-on landing condition. For a run-on landing maneuver, usually lower than 40 knots, the aircraft can have the main landing gear touch first and the nose landing gear down second. Depending on the braking system, aircraft can be with or without wheel-braking on. System 101 takes this maneuver into consideration. Therefore, gain scheduling of system 101 contains two portions, detailed with respect to hover landings and run-on landings.

First, system 101 not only works with unique trim FBW systems but also on Back-driven FBW and/or partial authority systems. When any axis FTR button is pressed, its associated control will be grounded as its initial trim value when the cyclic, pedal, or collective level is not displaced. When the control moves to a different value, the trim value will move to the new trim value per the pilot command. When the FTR button releases, the associated cyclic, pedal, or collective level starts back-driving to its new trim position. The feedback augmentation design will be engaged to stabilize the system to make the aircraft more stable to move to the new trim position. If the new aircraft trim position is unstable, the feedback system will make the aircraft stable at the closer new trim position. All these protection designs have been integrated into system 101.

With respect to hover landings, low-speed landings, and low speed touch and go functions within system 101; low-speed in this region is defined as $V_x \leq 5$ knots It is understood that the value of five knots being defined as low-speed margin for hover landing case is subject to change, depending on the flight test or pilot preference for landing. Usually, the lateral speed needs to be controlled within a couple knots region to avoid a large crab angle during landing.

In hover landing or run-on landing, the first thing the pilot will do to prepare rotorcraft 11 for landing is to adjust rotorcraft 11 for the landing headwind condition. If the disturbance rejection, gain margin, phase margin and bandwidth of the feedback system are tuned equally between a full authority feedback system, a reduced authority, and a limited authority for the integrators and control inputs gain, system 101 also allows rotorcraft 11 to land with a crosswind up to 35 knots. System 101 will place rotorcraft 11 in position even when rotorcraft 11 is transitioning between in-air, in-transit and on ground when all WOG sensors 127 are healthy. For the radar altimeter assistant design, it is recommended that rotorcraft 11 land into a headwind. It may allow a crosswind up to 15 knots only.

A typical rotorcraft's disturbance rejection (DR), gain margin (GM), phase margin (PM) and bandwidth (BW) of the control feedback system satisfy the requirements in the following tables.

| Longitudinal Axis | DR | GM | PM | BW |
|---|---|---|---|---|
| Lon Rate Loop | ≥0.6 | ≥8 | ≥40 | ≥2.0 |
| Lon Att Loop | ≥0.8 | ≥8 | ≥40 | ≥2.0 |
| Lon Vx Loop | ≥1.0 | ≥6 | ≥30 | ≥0.3 |
| Lon Position Hold Loop | ≥1.0 | ≥6 | ≥30 | ≥0.3 |

| Vertical Axis | DR | GM | PM | BW |
|---|---|---|---|---|
| Col VS Loop | 1.0 | ≥8 | ≥40 | ≥1.0 |
| Col Radar Altitude Hold Loop | 1.0 | ≥6 | ≥30 | ≥0.3 |

| Lateral Axis | DR | GM | PM | BW |
|---|---|---|---|---|
| Lat Rate Loop | ≥0.9 | ≥8 | ≥40 | ≥2.5 |
| Lat Att Loop | ≥0.9 | ≥8 | ≥40 | ≥2.5 |
| Lat Vx Loop | ≥1.0 | ≥6 | ≥30 | ≥0.3 |
| Lat Position Hold Loop | ≥1.0 | ≥6 | ≥30 | ≥0.3 |

| Directional Axis | DR | GM | PM | BW |
|---|---|---|---|---|
| Ped Rate Loop | ≥0.8 | ≥8 | ≥40 | ~2.0 |
| Ped Heading Hold Loop | ≥1.0 | ≥6 | ≥30 | ~2.0 |

The symbol of "~" implies the value is close by. Note that the above values alter from the aircraft to aircraft. Values may need to be re-verified from flight test.

Note that the gain margin, phase margin and bandwidth from the ground mode feedback control system (integrator washout) will be higher than that of the feedback system with integrators in normal operation. However, the disturbance rejection will be much lower than that of the integrator feedback control system. The tradeoff between the two feedback control systems will be dependent on the ground friction coefficient. The above values are suitable for standard airport concrete runway operations. For landing in icy conditions or other low-friction ground conditions, it is still recommended that the pilot lands the aircraft into a headwind.

With respect to using system 101 with run-on landings, a run-on landing consists of two maneuvers: (1) glideslope capture; and (2) flare control. For the run-on landing maneuver, regardless of the glideslope capture or flare control maneuver, lateral and pedal controls are strictly limited in the final approach mode. This implies that large lateral bank turns, heading changes, or sideslip flight is not allowed in the auto approach run-on landing function. In addition, the pitching angle associated with glideslope function and flare control is also critical for helicopter tail boom structural design. These two maneuvers are made via either a manual mode or an auto mode. In the manual mode, the pilot primarily controls the aircraft. In an auto mode, the flight systems of the aircraft primarily control the aircraft for landing. The glideslope capture angle for a flight director mode is approximately 2.5 to 3 degrees. For manual pilot control, the glideslope angle is variable and determined by pilot preference. To prevent the tail structure from touching down first during the final flare control for auto approach, the pitch angle during glideslope flare control is usually limited by the tail boom structural configuration angle, approximately between 8 to 12 degrees, varying from aircraft to aircraft.

Run-on high pitch angle flare control for manual pilot control is determined by the pilot's comfort level or skill. When the pilot selects manual stick flight and not auto approach, the control logic management system will be off to maintain pilot authority. Therefore, this manual function will switch off the system 101.

Furthermore, the run-on landing flight director auto approach function for pitch angle lower than 10 degrees on glideslope control is considered in the current logic protection system. Ground altitude from radar altimeter 128, with respect to rotorcraft 11 ground speed is gain-scheduled with respect to the pitch angle for flare control for run-on landing maneuver. The maximum pitch angle protection on flare control is limited by tail structural angle minus a selected angle, such as two degrees for tail structural protection for example. Vertical glideslope maneuver with respect to aircraft pitch angle is employed to accomplish the entire maneuver. Authority control limits of longitudinal and vertical axes are determined by the glideslope slope angle formula of $$\gamma = \tan^{-1}\left(\frac{V_z}{V_x}\right)$$

where $\gamma$ is the glideslope angle, $V_z$ is the vertical speed, and $V_x$ is the horizontal speed. The logic to trigger the flare control from approach to landing is determined by the following conditions $$\begin{cases} COD = 0 \\ \gamma \leq 5° \\ \theta \leq 10° \\ V_x \leq 45 \text{ knot} \\ \text{Ground\_Alt} \leq 100 \text{ feet} \end{cases}$$

Note that COD refers to collective out of detent and $\theta$ is the pitching angle. The above values are arbitrary and serve as a representative example. The conditions may change depending on size or type of applications.

When rotorcraft 11 reaches the above conditions, system 101 acts according to one of two functions. One is auto level off, if flight director auto approach mode is not engaged. Rotorcraft 11 will flare and then level off at a distance above the ground, 50 feet for example. The height above the ground is adjustable according to design constraints and/or preference. The other function is auto approach run-on landing function. This mode works with an airport instrument landing system. During the final approach, rotorcraft 11 will follow the airport glideslope angle for the final approach. Approximately 200 feet away from the final run-on touchdown point; rotorcraft 11 will start the flare control. At that point, the altitude of rotorcraft 11 is approximately 100 feet above the ground. Flare control of rotorcraft 11 can use the longitudinal controller only in the current design to finish the entire maneuver. Depending on pitch up angle, the final touchdown speed will be different. Unlike fixed wing aircraft, the final touch down speed has to be controlled within the stall speed region. For rotorcraft, one can set up the pitch up angle to be 7 or 8 degrees, rotorcraft 11 will land on the target but the final airspeed varies. As long as rotorcraft 11 pitch up angle is not larger than 10 degrees, rotorcraft 11 will not land short of the target and transition to auto hover mode.

At the moment rotorcraft 11 touches the ground, system 101 will automatically ground the integrators on all four axes. After two seconds, these integrator internal values will be washed out. Within this two-second period (delay 106), the pilot can increase collective and rotorcraft 11 will immediately take off and return to normal flight condition, when WOG contact or down signals are clear. If touch down period is longer than two seconds and the integrators have been washed-out, the threshold of collective plays an important role. When the collective level is pulled for more than 0.5 inches or vertical speed command is higher than that of 120 feet per minute rate or the glideslope angle changes sign, air ground logic will restore collective integrator and taking off immediately. The above concludes the auto approach landing maneuver.

Figure 14:
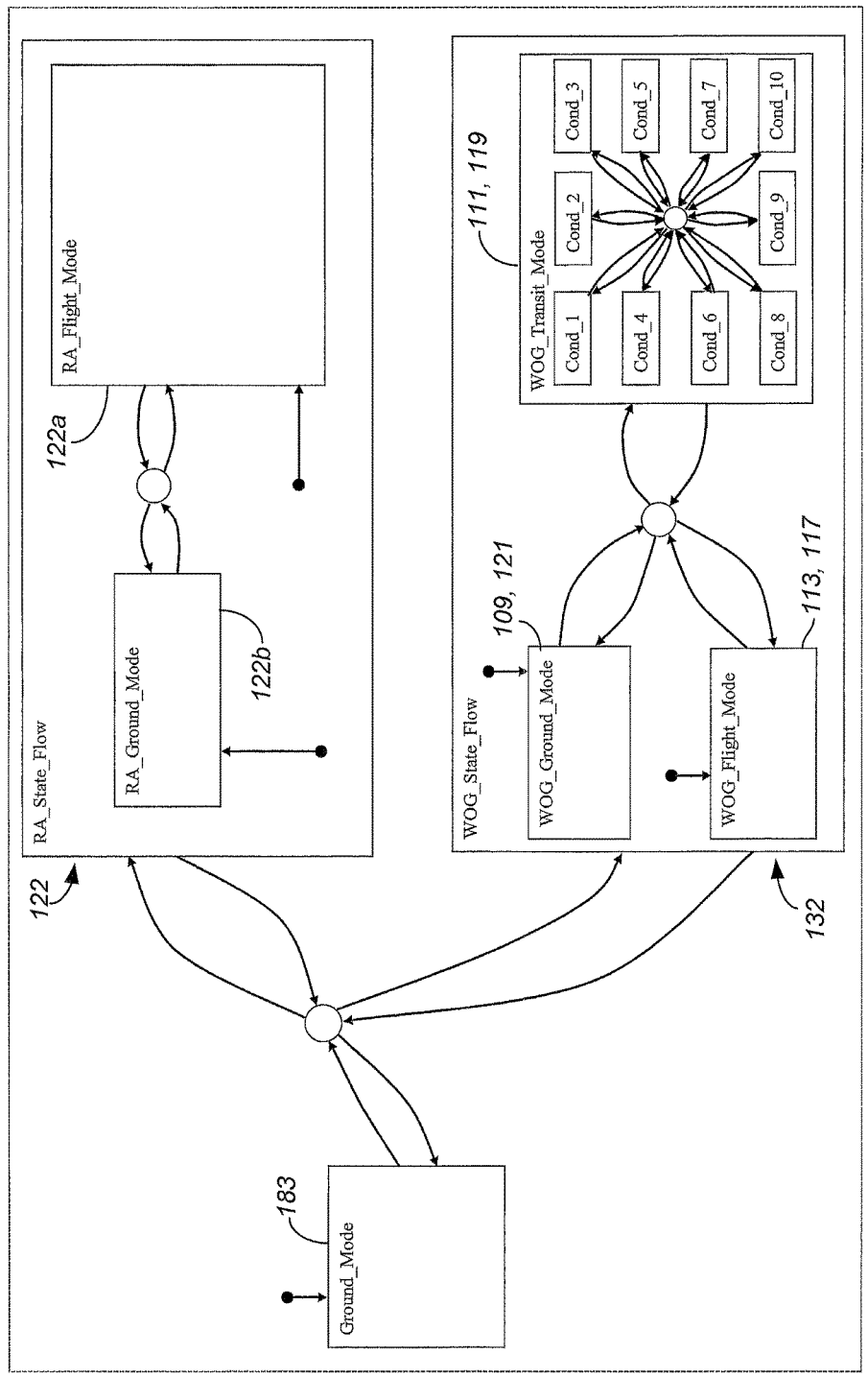
FIG. 14 is a simplified chart of the stateflow design of the system of FIG. 1 with the logic of FIG. 5 and the logic of FIGS. 12 and 13.

Referring now also to FIG. 14 in the drawings, a chart of the entire Stateflow design 181 of system 101 is illustrated. In FIG. 14, it is shown that the Stateflow design of system 101 contains three portions. The first portion is the ground mode 183. The ground mode 183 is also called the permanent ground mode for default mode and for both Radar Altimeter/WOG ground mode timer. This is the final default mode for rotorcraft 11.

The second portion is the WOG logic 132 management design. In this portion, the in-transit mode 111, 119 contains ten conditions. The details of these transit mode conditions have been discussed previously. These conditions are primarily controlled by mathematic calculations from the state combinations 131 of each WOG output 129, as seen in FIG. 3. The output 129 includes data representing an individual score for the respective landing gear. The method of reducing the control authorities from full to partial is illustrated in flow chart of FIG. 11. FIGS. 3 and 11 conclude the transit mode design.

The in-flight mode 113, 117 and ground mode 109, 121 designs are very straight forward. The score will determine rotorcraft's 11 status of these two modes. However, for the ground mode 109, 121, the ground mode is called temporary ground which needs to go through delay 106. Delay 106 is set based on flight test data and the best practice of most pilots' behaviors for touch and go functions. The in-flight mode calculation is purely based on WOG calculation.

The third portion is the radar altimeter assistant logic 122. Radar altimeter assistant logic 122 was mentioned in FIGS. 12 and 13. Logic 122 contains two portions. One is for the in-flight mode 122a and the other is for ground mode 122b. The in-flight mode 122a of radar altimeter assistant logic 122 has two functions: (1) for the in-flight and (2) for transit flight. The transit flight is based on ground altitude and collective out of detent signal to be on the down maneuver only. The two feet difference from the aircraft height between on-ground and in-transit is set for latch design to avoid frequently triggering the transit mode on-off situation. This latch value can be set for any value per flight test results with respect to ground effect.

The in-flight mode 122a on radar altimeter assistant logic 122 is also based on ground altitude, collective out of detent signal as well as level-flight or climbing function in the vertical axis. Details of all these functions have been discussed in session previously.

The ground mode 122b in the radar altimeter assistant logic 122 is also called temporary for a delay, such as a two second timer similar to the WOG timer. Several reasons are considered before making the duration of the delay decision. One is to make the WOG logic 132 and radar altimeter assistant logic 122 symmetric during the touch down maneuver. The other reason is to make touch-and-go function to be much robust. One significant difference between radar altimeter assistant logic 122 and WOG logic design 132 is the set and re-set ground altitude function on radar altimeter assistant logic 122. With proper selection of the set and reset ground altitudes (height altitudes), the radar altimeter assistant logic 122 can perform as well as WOG logic 132. For examples, the skid type helicopter landing system without WOG logic 132 design can be considered as one of the special cases in the current logic management design through radar assistant logic 122. Of course, a ground switch can also be easily integrated into the current design to force rotorcraft 11 to be ground when the pilot intends to switch it to the ground. However, this standard ground trivial design can be easily added into the current design.

Entries of the initial-conditions on Stateflow blocks 122, 132, 183 are dependent on the associated flight situations. In order to design system 101 to be engage-able during air-start or air-switch, two default entry points on WOG Stateflow design exist: (1) for on-ground mode; and (2) for in-flight condition. The reason to set the two initial-condition flight entries is to assume radar altimeter assistant logic 122 can be re-engaged during the flight, while the ground altitude is higher than that of transit-mode. In such a situation, when the WOG logic 132 becomes healthy, the aircraft can be directly triggered to the in-flight mode. This is why the WOG Stateflow logic design can be entered by in-flight mode.

Similarly, the initial conditions of the radar altimeter mode can be entered to either the in-flight mode or the on-ground mode. Depending on timing of the WOG failure situation occurrence in flight, the entries of Radar altimeter assistant logic 122 can be either on ground or in-flight. In-transition mode is a special condition for the entire integration design. During the normal operation, the initial-condition triggering point will be on-ground.

It is understood that system 101 may be used for sloped landings. System 101 ensures that: (1) adequate cyclic pitch is available both laterally and longitudinally and (2) proper gear-to-tail clearance to ground angles is available for the desired slope in any direction. No requirement has been set regarding the angle from all four directions. This angle is set based upon the comfort level from the pilot. These slope angles change individually. The slope limitation for the four directions in system 101 for the single wheel touch or down function are limited to approximately 10 degrees, although this may be modified for different aircraft. After these limited slope angles, the pilot can still land on larger slopes. However, the WOG Stateflow logic 132 will be in washed-out mode to protect the aircraft from flipping-over.

System 101 may also be used in ground taxi operations. In fact, ground taxi operations for a FBW rotorcraft is critical, since rotorcraft 11 usually does not install a nose wheel steering system to assist rotorcraft 11 for ground operation. In addition, the rotorcraft does not direct that mechanism to inform the pilot where the swashplate actuator positions are and the tail rotor travel is from their neural trim positions.

The ground taxi operation for FBW rotorcraft requires that the pilot moves the aircraft forward and then uses the tail rotor for level yaw turn. Therefore, the ground speed gain schedule on the ground mode with respect to the yaw control command is required to accomplish the entire maneuver. In addition, the entire maneuver shall also be limited by the turn rate which shall be gain scheduled with ground speed and yaw turn control command. The yaw rate integrator on the higher turn rate may need to be turned on and limited. To make the aircraft safer, the feedback control system for the main rotor shall be on for stability purposes. Disturbance rejection, gain margin, phase margin and bandwidth of the feedback system without integrator shall also be calculated to ensure the safety of ground operations. Usually, these values are tuned to be much better than with the integrators in normal operation.

Controller 30 retrieves input data from database 36, I/O interface 32, and/or one or more users, data sources, and/or other systems. In some embodiments, logic management system 118, as shown in FIG. 3, can be implemented as software, for example where the software is embodied in computer-readable media and executable by one or more computer processors to regulate the control authority of the aircraft.

The current application has many advantages over the prior art including the following: (1) combining logic management with ground operations; (2) the ability to adequately control an aircraft during transitions between in-flight and on-ground modes; (3) ability to individually regulate axis integrators with respect to individual landing gear states; (4) greater control of the aircraft during selected maneuvers; and (5) ability to limit actuator run-off and a loss of control of the aircraft within the transit region.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A logic management system for determination of air/ground status of an aircraft, comprising:
    a landing gear system, having;
        a first landing gear, having at least a first sensor configured to provide an output signal of a condition of the first landing gear;
        a second landing gear, having at least a first sensor configured to provide an output signal of a condition of the second landing gear; and
        a third landing gear, having at least a first sensor configured to provide an output signal of a condition of the third landing gear;
    a logic management system in communication with all of the first sensors, the logic management system being configured to receive and process the output signals and automatically classify a mode of the aircraft as being within a transition region wherein a portion of the aircraft contacts the ground; and
    a controller in communication with the logic management system to receive signal data from the logic management system, the controller being in communication with a control axis actuator to regulate a level of control authority provided to a pilot based upon the mode of the aircraft in the transition region.

2. The air/ground contact logic management system of claim 1, wherein the control authority is selectively adjusted by the controller as the aircraft proceeds through the transition region.

3. The air/ground contact logic management system of claim 1, wherein the first sensor of the first landing gear is in communication with the first landing gear of the aircraft, the first landing gear having at least one state determined by an engagement force acting upon the first landing gear.

4. The air/ground contact logic management system of claim 3, wherein the first sensor of the first landing gear is a weight-on-gear sensor.

5. The air/ground contact logic management system of claim 3, wherein the first sensor of the first landing gear is a tire pressure monitor.

6. The air/ground contact logic management system of claim 3, wherein the mode of the aircraft changes as a state of the landing gear system changes.

7. The air/ground contact logic management system of claim 1, wherein the logic management system comprises:
    a sensor logic configured to receive and process the output signal from the first sensor of the first landing gear and use a mathematical process to assign an integer value to the output signal; and
    a score management logic in communication with the sensor logic to receive and process the integer value, the score management logic being configured to classify the mode of the aircraft.

8. The air/ground contact logic management system of claim 7, wherein the mathematical process used by the sensor logic selectively assigns the integer value based upon the state of the first landing gear.

9. The air/ground contact logic management system of claim 8, wherein the controller includes a delay while the aircraft performs a landing maneuver, the delay being a time limit in which the controller retains selected integrators in a grounded mode.

10. The air/ground contact logic management system of claim 1, further comprising a second sensor.

11. The air/ground contact logic management system of claim 10, wherein the second sensor is configured to operate as a secondary backup system in case of failure of the first sensor.

12. The air/ground contact logic management system of claim 10, wherein the second sensor is a radar altimeter.

13. The air/ground contact logic management system of claim 1, wherein the controller and logic management system are configured to be incorporated into existing aircraft fly-by-wire control systems as a retrofit.

14. An aircraft comprising:
    a landing gear coupled to the aircraft;
    a fly-by-wire control system used to control the aircraft; and
    an air/ground contact logic management system configured to communicate with the fly-by-wire control system to regulate control authority during selected maneuvers, the air/ground contact logic management system including:
        a first sensor coupled to the landing gear and configured to transmit an output signal pertaining to a discrete landing gear state condition;
        a second sensor configured to transmit an output signal pertaining to a landing gear engagement force condition;
        a logic management system in communication with the first sensor and with the second sensor, being configured to receive and process the output signal of the first sensor and the output signal of the second sensor, and automatically classify a mode of the aircraft based upon the discrete landing gear state condition and the landing gear engagement force condition; and
        a controller in communication with the logic management system to receive signal data from the logic management system, the controller being in communication with a control axis actuator to selectively regulate the level of control authority provided to a pilot based upon the mode of the aircraft in the transition region.

15. The aircraft of claim 14, wherein the logic management system is configured to classify the mode of the aircraft into at least one of an in flight mode, an air/ground transit mode, and an on ground mode.

16. The aircraft of claim 15, wherein the control authority is individually regulated with respect to the control axis actuator as a result of the individual landing gear states.

17. A computer-implemented method for regulating the control authority of an aircraft, the method being performed using one or more processing units, the method comprising:
receiving an output signal from at least one sensor, the sensor configured to detect contact between the aircraft and ground;
assigning an integer value to the output signal, the integer value being predetermined by a mathematical method programmed into a logic management system;
compiling the integer values from the at least one sensor into a total score;
transmitting the integer values and the total score to a score management logic;
determining a mode of the aircraft through the score management logic, the mode of the aircraft being based upon the total score;
classifying the mode of the aircraft automatically into at least one of an in flight mode, an air/ground transit mode, and an on ground mode; and
regulating an axial control actuator to adjust the control authority of a pilot, the axial control actuator being controlled through a controller in communication with the score management logic and existing fly-by-wire control laws in the aircraft;
wherein a range of the integer value is based upon the at least one sensor being in an in flight mode, an air/ground mode, or an on ground mode.

18. The computer-implemented method of claim 17, wherein the output signal represents a state of a landing gear.

19. The computer-implemented method of claim 18, further comprising:
calculating an engagement force acting upon the landing gear.

20. The computer-implemented method of claim 18, further comprising:
applying a delay to the controller to retain control of selected axial control actuators when the aircraft is in a grounded mode.

* * * * *